US006926822B2

(12) United States Patent
Sharkey

(10) Patent No.: US 6,926,822 B2
(45) Date of Patent: Aug. 9, 2005

(54) METHOD AND APPARATUS FOR REMOVING PARTICULATE CONTAMINANTS FROM COMMERCIAL LAUNDRY WASTEWATER

(76) Inventor: James P. Sharkey, P.O. Box 304, Calverton, NY (US) 11933

(*) Notice: Subject to any disclaimer, the term of this patent is extended or adjusted under 35 U.S.C. 154(b) by 0 days.

(21) Appl. No.: 10/752,058

(22) Filed: Jan. 6, 2004

(65) Prior Publication Data

US 2004/0134848 A1 Jul. 15, 2004

Related U.S. Application Data

(60) Division of application No. 10/009,000, filed on Dec. 7, 2001, now Pat. No. 6,692,638, which is a continuation-in-part of application No. 09/400,418, filed on Sep. 21, 1999, now abandoned.

(51) Int. Cl.[7] .............................. B01D 36/02; C02F 9/02
(52) U.S. Cl. ................... 210/167; 210/195.1; 210/196; 210/258; 210/259; 210/416.1; 210/513; 210/532.1; 210/921
(58) Field of Search .............................. 210/167, 195.1, 210/196, 252, 258, 259, 416.1, 513, 532.1, 921

(56) References Cited

U.S. PATENT DOCUMENTS

| 5,207,922 | A | * | 5/1993 | McFarlan et al. ............ 210/708 |
| 6,195,825 | B1 | * | 3/2001 | Jones ............................. 8/158 |
| 6,474,111 | B1 | * | 11/2002 | Pattee ........................ 68/18 F |
| 6,692,638 | B2 | * | 2/2004 | Sharkey ...................... 210/220 |
| 2002/0153334 | A1 | * | 10/2002 | Sharkey ...................... 210/791 |

* cited by examiner

Primary Examiner—Robert James Popovics
(74) Attorney, Agent, or Firm—Galgano & Burke, LLP

(57) ABSTRACT

A filtration apparatus includes a laundry waste sump, a primary 50 micron static screen filter, a 9,000 gallon equalization tank, at least one secondary media/carbon filter, a sludge holding tank with a pump to return excess water to the equalization tank, a backwash pump, an air blower, and a clear well tank water source for backwash. An exemplary embodiment of the invention also includes a surge tank between the primary and secondary filters and a surge tank between the secondary filter and the clear well tank.

9 Claims, 1 Drawing Sheet

METHOD AND APPARATUS FOR REMOVING PARTICULATE CONTAMINANTS FROM COMMERCIAL LAUNDRY WASTEWATER

This application is a divisional of application Ser. No. 10/009,000, filed Dec. 7, 2001, now U.S. Pat. No. 6,692,638, entitled "Method and Apparatus for Removing Particulate Contaminants from Commercial Laundry Wastewater", which is a continuation-in-part of application Ser. No. 09/400,418 filed Sep. 21, 1999, now abandoned, entitled "Method and Apparatus for Removing Particulate Contaminants from Commercial Laundry Wastewater", the complete disclosures of which are hereby incorporated by reference herein. These applications are related to co-owned application Ser. No. 09/837,766 filed Apr. 18, 2001, now U.S. Pat. No. 6,672,462, entitled "Method and Apparatus for Removing Particulate Contaminants from Commercial Laundry Wastewater", the complete disclosure of which is hereby incorporated by reference herein.

BACKGROUND OF THE INVENTION

1. Field of the Invention

The present invention relates generally to a filtration apparatus for separating solid particles from a liquid. More particularly, the invention relates to filtration apparatus for removing particulate contaminants from commercial laundry wastewater and to methods for accomplishing the same.

2. State of the Art

State and local governments across the country as well as the federal government have enacted new laws or expanded existing laws to reverse or limit the threat of environmental pollution. These environmental laws are typically directed toward commercial enterprises which create various wastes streams as a by-product of manufacturing products or providing services. The commercial laundry industry and particularly commercial Laundromats are specifically affected by environmental laws which limit the amount of suspended solids or particulate contaminants in commercial laundry wastewater which can be discharged into the environment. Particulate contaminants in commercial laundry wastewater generally consist of lint, hair, dirt and soap scum. To meet the requirements of current environmental laws, the amount of particulate contaminants in commercial laundry wastewater must be reduced to an acceptable level before it is discharged into the ground water and/or municipal sewage system.

Co-owned U.S. Pat. No. 5,350,526 discloses a filtration apparatus specifically intended for removing particulate contaminants from commercial laundry wastewater. It has at least one porous mesh-like filter bag coupled between an inlet manifold for receiving wastewater containing particulate contaminants and an outlet manifold for discharging the particulate contaminants separated from the wastewater. The filter bag is agitated by a paddle, so as to prevent the mesh-like material of the filter bag from being clogged. The apparatus is capable of trapping particles as small as 5 microns depending on the filter bag mesh. Those skilled in the art will appreciate that the finer the mesh the more slowly the water will be filtered. One of the challenges in designing a filter for commercial laundry wastewater is to be able to accommodate a flow rate of about 12,500 gallons per day.

Co-owned U.S. Pat. No. 5,575,913 discloses a filtration apparatus having a housing, a filter element, an inlet, a first discharge outlet and a second discharge outlet. The housing includes a bottom and an upwardly extending surrounding wall. The filter element is disposed in the housing and spans the surrounding wall with the filter element spaced above the bottom of the housing to define an upper chamber and a lower chamber, and the filter element being angled, preferably 45 degrees from the horizontal, so that one end of the filter element is lower relative to the other end. The inlet is in fluid communication with the upper chamber for receiving wastewater containing particulate contaminants. A first discharge outlet is in fluid communication with the lower chamber for discharging filtered wastewater. The second discharge outlet is in fluid communication with the upper chamber adjacent the lower end of the filter element for discharging filtered particulate contaminants. The apparatus is capable of trapping particles about 50 microns in diameter (or smaller, i.e. 5–10 microns).

The previously incorporated parent application discloses a filtration apparatus which includes a rectangular tank having an upper baffle and a lower baffle, layers of stone and carbon between the baffles, a water inlet above the upper baffle, and a water outlet below the lower baffle. The filtration apparatus is preferably used in conjunction with other apparatus including additional filters, holding tanks, a backwash pump and air blower, and a leaching pool system. The preferred implementation includes a laundry waste sump, a primary 50 micron static screen filter, an array of 100 micron filter socks, a 9,000 gallon holding tank, a pair of 100 gallon surge tanks, a pair of parallel secondary carbon filters according to the invention, a 5 micron polishing filter, a backwash pump, an air blower, a 6,000 gallon sludge holding tank, and a system of four leaching pools. According to the preferred methods, the carbon filters are operated for fourteen hours continuously and backwashed for ten minutes every day. Each carbon filter operates at a flow rate of approximately 9,000 gallons per day and is backwashed with 450 gallons of water.

The previously incorporated related application discloses a filtration apparatus which includes a filter element disposed at a 45 degree angle defining an upper chamber for solids and a lower chamber for liquid. A trough is disposed at the lower end of the filter element. The floor of the trough funnels toward a central drain and an overflow drain is located approximately 8 inches above the trough floor. The lower chamber is provided with a drain for recirculating water to a sprayer above the filter element and is also provided with an overflow drain approximately 8 inches above the floor.

SUMMARY OF THE INVENTION

It is an object of the invention to provide an improved filtration apparatus and method for separating and removing particulate contaminants from a relatively large continuous flow of laundry wastewater for discharge of the filtered wastewater into the environment, i.e., ground water and/or municipal sewage system.

It is another object of the invention to provide such a filtration apparatus having a filter element for separating particulate contaminants from laundry wastewater in which the separated particulate contaminants can be easily and quickly manually or automatically removed from the apparatus without injuring or removing the filter element.

It is still yet another object of the present invention to provide such a filtration apparatus that is easily and inexpensively manufactured, highly efficient in operation, and which requires little lifetime maintenance.

In accord with these objects which will be discussed in detail below, the filtration apparatus of the present invention includes the filtration apparatus disclosed in either of the previously incorporated applications, but it is preferably the filtration apparatus disclosed in the related co-owned application Ser. No. 09/837,766. According to the invention, the filtration apparatus is used in conjunction with other apparatus including additional filters, holding tanks, a backwash pump and air compressor, and a leaching pool system.

A presently preferred implementation of the filtration apparatus includes a laundry waste sump, a primary 50 micron static screen filter (preferably as disclosed in previously incorporated Ser. No. 09/837,766), a single 100 micron filter sock, a 9,000 gallon holding tank, a pair of 100 gallon surge tanks, at least one secondary media filter, a 5 micron polishing filter, a backwash pump, an air blower, a 6,000 gallon sludge holding tank, one clear well, and a system of leaching pools. Wastewater enters the sump by gravity flow and is pumped from the sump to the primary 50 micron static screen filter. Solids removed by the primary filter are discharged by gravity to the 100 micron filter sock where they are dewatered with the water therefrom being returned to the sump. The primary effluent from the primary filter is delivered by gravity to the 9,000 gallon holding (equalization tank). Water from the equalization tank is pumped to the first 100 gallon surge tank from which it flows by gravity to the secondary media filter(s). The effluent from the media filter(s) is delivered by gravity to the second 100 gallon surge tank from which it is pumped through the 5 micron polishing filter into the clear well and from there to the leaching pools. Water from the clear well pool is used to backwash the media filter(s) using the backwash pump and the air blower which aerates the backwash water. Optionally, a source of fresh water may be used for backwash or mixed with the clear water for backwash. During backwash, backwash water exiting the media filter(s) is directed to the sludge holding tank(s).

According to the presently preferred methods of the invention, the carbon filters are operated for 14 to 23 hours continuously and backwashed for ten minutes every day. Each carbon filter operates at a flow rate of approximately 9,000 gallons per day and is backwashed with 450 gallons of water.

Additional objects and advantages of the invention will become apparent to those skilled in the art upon reference to the detailed description taken in conjunction with the provided figure.

DETAILED DESCRIPTION OF THE PREFERRED EMBODIMENTS

Figure 1:
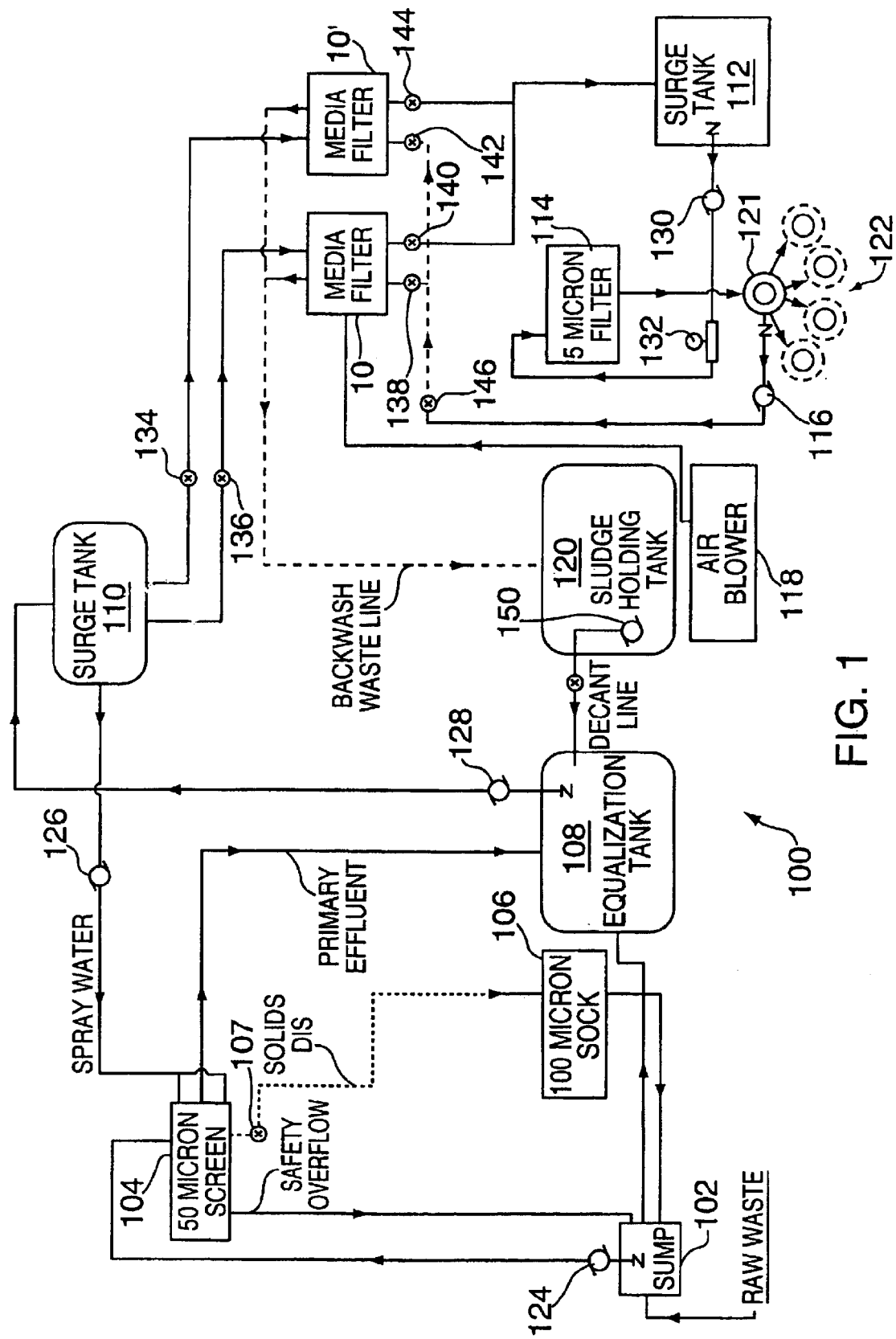
FIG. 1 is a schematic diagram of a presently preferred implementation of the invention.

Turning now to FIG. 1, a presently preferred embodiment of the invention 100 includes a laundry waste sump 102, at least one primary fifty micron static screen filter(s) 104, a one hundred micron filter clean out sock 106, one or more 9,000 gallon (depending on the size of the filter requirement) equalization tank(s) 108, at least one secondary Media/carbon filter(s) 10, 10', a five micron polishing filter 114, a backwash pump 116, an air blower 118, one or more 6,000 gallon sludge holding tank(s) 102, one or more 3,000 gallon clear well holding tank(s) 121, and a system of four to nine leaching pools 122.

In operation, wastewater enters the sump 102 by gravity and is pumped from the sump by a sump pump 124 (2", 100 gpm) to the primary fifty micron static screen filter 104 utilizing a six square foot fifty micron fabric screen. The spray water for the filter 104 is pumped by a spray pump 126 from the first surge tank 110. Filter 104 has an anticipated safety overflow system that is returned to the sump 102. In the event that the sump 102 overflows, the overflow is directed to the holding tank 108. Solids (virtually 100% of hair and lint) removed by the primary filter 104 are discharged periodically by gravity (via valve 107) to a single lint cleanout one hundred micron sock 106 where it is dewatered with the water therefrom being returned to the sump 102. The dewatered solids are disposed of as commercial waste.

The primary effluent from the primary filter 104 is delivered by gravity to the (preferably 9,000 gallon) holding (equalization) tank 108; the size of the holding tank will vary with system requirements. Water from the equalization tank 108 is pumped by filter pump 128 (e.g., horizontal centrifugal 20 gpm pump) to the first one hundred gallon surge tank 110 from which it flows by gravity to the at least one secondary media filter(s) 10, 10', preferably containing carbon and/or other filtering media. The effluent from the filter(s) 10, 10' is delivered by gravity to the second one hundred gallon surge tank 112 from which it is pumped by final pump 130 (e.g., 20 gpm horizontal centrifugal filter pump) through the five micron polishing filter 114 to a preparing three thousand gallon clear well tank 121 and from there into the system of four to nine leaching pools 122. The system involving the leaching pools is such that the water will be pumped to the clear well 121 from surge tank 112. The clear well first will fill to the top of the tank. At the top of the clear well tank, there is a single pipe for each individual leaching pool 122. The pipes to the leaching pools are piped so that they drain by gravity to each and every leaching pool, evenly distributing the water so that each pool receives the same amount of water as each other at the same time. The importance of this is so that the water will enter each leaching pool more slowly. This will allow the water to leach out of the bottom of the pool and into the soil. This prevents the water from accumulating and rising inside the pools. When the water has an opportunity to rise inside the leaching pool, the weight of the water condenses the bottom sand and thus slows down the draining process of the leaching pool. In order to monitor performance, a 1½" turbine flow meter 132 is arranged at the entrance to the polishing filter 114.

Water from the clear well tank 121 is used to backwash the carbon filters 10, 10' using the backwash pump 116 and the air blower 118 which aerates the backwash water. Optionally, a source of fresh water may be used for backwash or mixed with the clear water for backwash. The fresh water source may be located between 121 and 116 or between 114 and 121. Valves 134, 136, 138, 140, 142, and 144 are operated to remove the filters 10, 10' from the filtration system and couple them to the backwash system. Valve 146 is operated to couple the backwash pump 116 to the backwash system; in operation, pump 116 would be operated concurrently with air blower 118 to backwash media filters 10, 10'. Valves 134 and 136 control the flow rate into the filters 10, 10'. Valves 140 and 144 control the outlet flow into tank 112; they are typically preset to be the same as the inlet flow rate set by valves 134 and 136. Valves 138 and 142 control how the volume and speed of the backwash into filters 10 and 10'. During backwash, backwash water exiting the carbon filters is directed to the six thousand gallon sludge holding tank 120.

According to the presently preferred methods of the invention, the filters 10, 10' are operated for 14 to 23 hours continuously and backwashed for ten minutes every day. Each filter 10, 10' operates at a flow rate of approximately nine thousand gallons per day and is backwashed with four hundred fifty gallons of water. Thus, the sludge tank 120 will receive approximately nine hundred gallons a day. The sludge tank 120 will receive the sludge water from the media filters 10, 10', and will hold the wastewater for a period not less than 6 hours. This time allows the sludge to precipitate from the water and fall to the bottom of the sludge tank thereby thickening the sludge. The top water that is left after the sludge falls to the bottom is pumped via a pump (and timer) 150, over to the holding tank 108.

The system 100 shown in FIG. 1 is capable of removing about 85% of total dissolved solids (TDS) and 95–100% of total suspended solids (TSS) from laundry wastewater. The carbon/media filters according to the invention are capable of reducing the concentration of detergents (MBAS) to below 1.0 mg/l and reducing oil and grease concentration to below 10 mg/l.

There have been described and illustrated herein methods and apparatus for removing particulate contaminants from commercial laundry wastewater. While particular embodiments of the invention have been described, it is not intended that the invention be limited thereto, as it is intended that the invention be as broad in scope as the art will allow and that the specification be read likewise. It will therefore be appreciated by those skilled in the art that yet other modifications could be made to the provided invention without deviating from its spirit and scope as so claimed.

What is claimed is:

1. A water filtration apparatus, comprising:
    a) a primary filter having an inlet, a first discharge for discharging a combination of solids and water, and a primary effluent discharge;
    b) a filter sock having an inlet coupled to said first discharge of said primary filter and an outlet coupled to said primary filter inlet via a pump-operated sump;
    c) an equalization tank having a plurality of inlets and one outlet, said primary effluent discharge being coupled to one of the inlets of said equalization tank such that primary effluent is delivered by gravity to said equalization tank;
    d) a first surge tank having an inlet and a plurality of outlets, said inlet of said surge tank being coupled to said outlet of said equalization tank;
    e) pump means for pumping said primary effluent from said equalization tank to said first surge tank;
    f) a secondary filter having an inlet and an outlet, said inlet of said secondary filter being coupled to one of said outlets of said first surge tank such that primary effluent is delivered by gravity to said secondary filter; and
    g) a plurality of leaching pools having an inlet, said inlet of said leaching pools being coupled downstream of said outlet of said secondary filter.

2. A water filtration system according to claim 1, wherein:
    said primary filter includes an approximately 50-micron screen,
    said filter sock is an approximately 100-micron filter, and
    said secondary filter is one of a carbon filter and a media filter.

3. A water filtration system according to claim 1, wherein:
    said equalization tank has a capacity of approximately 9,000 gallons, and
    said first surge tank has a capacity of approximately 100 gallons.

4. A water filtration system according to claim 1, further comprising:
    g) a second surge tank, said second surge tank having an inlet and an outlet, said inlet of said second surge tank being coupled to said outlet of said secondary filter such that primary effluent is delivered by gravity to said second surge tank and said outlet of said surge tank being coupled to said inlet of said plurality of leaching fields.

5. A water filtration apparatus according to claim 4, wherein: said second surge tank has a capacity of approximately 100 gallons.

6. A water filtration apparatus according to claim 4, wherein said inlet of said plurality of leaching pools comprises a clear well coupled to each of said leaching pools.

7. A water filtration apparatus according to claim 4, further comprising:
    h) a polishing filter having an inlet and an outlet, said inlet of said polishing filter being coupled to said outlet of said second surge tank and said outlet of said polishing filter being coupled to said inlet of said plurality of leaching fields.

8. A water filtration apparatus according to claim 7, wherein: said polishing filter is an approximately 5-micron filter.

9. A water filtration apparatus according to claim 7, wherein: said inlet of said plurality of leaching pools comprises a clear well coupled to each of said leaching pools.

* * * * *